Nov. 22, 1927.

W. J. GAGNON 1,650,505

COUPLING

Filed June 25, 1927

Inventor:
WILLIAM J. GAGNON
By his Attorneys

Patented Nov. 22, 1927.

1,650,505

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

COUPLING.

Application filed June 25, 1927. Serial No. 201,542.

My invention relates to couplings, and the object of my invention is to provide a coupling for use with bead chains.

In the accompanying drawings—

Figure 1:
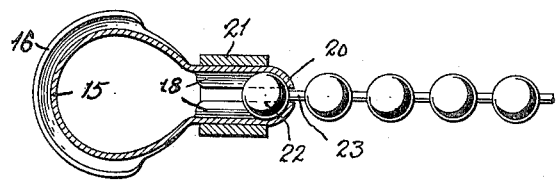
Fig. 1 is a section through a coupling on the line 1—1, Fig. 2.
Figure 2:
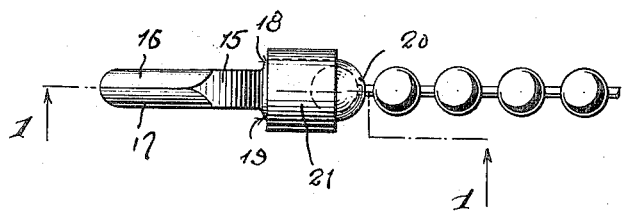
Fig. 2 is a side elevation viewed at right angles to the section of Fig. 1.

Referring to the drawings, the coupling is formed from a sheet metal blank comprising a web 15 provided intermediate its ends with lateral flanges 16 and 17, and at each end with lateral flanges 18 and 19. The flanged mid-portion of the web is bent around to ring form, open at one side. Its flanges 16 and 17 are turned outward and form, with the web a circumferentially split tubular area throughout the extent of the flanges. Smooth sides and a stiff crown area for this portion of the coupling are thus obtained.

The ends of the web are spaced apart and extend in the same direction from the ring area. The flanges 18 and 19 on opposite sides of each end are offset toward each other, and the portion of the web intermediate the flanges preferably arched, thus forming in effect a longitudinally split tube which is partially closed by the offset ends 20 of the web.

Cooperating with the split tubular portion of the coupling is a sleeve 21, slidably engaged therewith.

The coupling is intended for use with a bead chain of the type comprising balls 22 flexibly interconnected by links 23. To apply the coupling to the chain it is merely necessary to slide the sleeve 21 over the end of the chain. The tubular portion of the coupling may then be spread sufficiently to accommodate the end ball of the chain, upon which the tube is then closed and held in closed position by sliding the ring 21 thereon. The end flanges 20 detain the chain ball against longitudinal escape while the side flanges 18 and 19 prevent its lateral escape. While the chain ball is free to swivel, it cannot escape by movement toward the open ring area of the coupling, since its link, although it may enter between the flanges 18 and 19, cannot pass the locking sleeve 21.

This coupling may be used for engagement with a jump ring or the like, or its ring area may be substituted for a jump ring to establish connection with an associated object. In either case it is economical to manufacture and efficient in service.

I claim as my invention—

1. A coupling comprising a strip of sheet metal bent back upon itself intermediate its ends to form a ring area with spaced substantially parallel end reaches projecting therefrom, said ring area having side flanges offset toward each other to form a peripherally split hollow tube, and the parallel end reaches having side flanges offset toward each other and cooperating to form a longitudinally split tubular section, together with an annular sleeve slidable on said tube section and adapted to hold the same in clamping engagement with the end ball of the chain.

2. A jump ring comprising a strip of sheet metal bent to ring form intermediate its ends, said ends being spaced apart and extending substantially parallel from the ring, flanges at opposite sides of said end portions, said flanges being offset toward each other to form a longitudinally split tube, the ring area having side flanges offset to form a peripherally split hollow tube, in combination with a bead chain having an end ball, the over-all diameter of which approximates the internal diameter of the hollow tube section, together with a sleeve slidable on said tube section and serving to hold the same in clamping engagement with the end ball of the chain.

In testimony whereof I have signed my name to this specification.

WILLIAM J. GAGNON.